United States Patent [19]

Christy et al.

[11] Patent Number: 5,401,402
[45] Date of Patent: Mar. 28, 1995

[54] PROCESS AND APPARATUS FOR TREATING SEWAGE SLUDGE

[75] Inventors: Paul G. Christy, Devon; Richard W. Christy, Ambler, both of Pa.

[73] Assignee: RDP Company, Plymouth Meeting, Pa.

[21] Appl. No.: 220,458

[22] Filed: Mar. 30, 1994

Related U.S. Application Data

[60] Continuation of Ser. No. 954,657, Sep. 30, 1992, abandoned, which is a division of Ser. No. 749,988, Aug. 26, 1991, Pat. No. 5,186,840.

[51] Int. Cl.⁶ .................. C02F 11/14; C02F 11/18
[52] U.S. Cl. .................. 210/205; 210/219; 366/152; 366/153; 366/156; 366/300; 366/320
[58] Field of Search .................. 210/751, 198.1, 205, 210/206, 219; 366/300, 320, 152, 153, 156, 177, 20, 35

[56] References Cited

U.S. PATENT DOCUMENTS

| | | | |
|---|---|---|---|
| 2,297,195 | 9/1942 | Behringer . | |
| 2,723,954 | 11/1955 | Young . | |
| 2,904,401 | 9/1959 | Booth | 366/152 |
| 3,793,841 | 2/1974 | Dozsa . | |
| 4,028,240 | 6/1977 | Manchak, Jr. | 210/751 |
| 4,043,904 | 8/1977 | Endo et al. | 366/297 |
| 4,079,003 | 3/1978 | Manchak | 210/747 |
| 4,118,243 | 10/1978 | Sandesara . | |
| 4,190,372 | 2/1980 | Takagi et al. | 366/153 |
| 4,270,279 | 6/1981 | Roediger | 210/609 |
| 4,295,972 | 10/1981 | Kamei | 210/710 |
| 4,306,978 | 12/1981 | Wurtz . | |

(List continued on next page.)

FOREIGN PATENT DOCUMENTS 835216  3/1955  United Kingdom .

OTHER PUBLICATIONS

Wallace & Tiernan, Paste-Type Lime-Slaking Systems, Sep. 1989.
Berman, Lime Stabilization/Pasteurization vs. Traditional Methods, Jun. 1989.
Westphal & Christensen, Lime Stabilization: Effectiveness of Two Process Modifications, Villanova University, Jun. 1982.
EPA Process Design Manual for Sludge Treatment and Disposal, Sep. 1979.
Christensen, Lime Stabilization of Wastewater Sludges-An Assessment, Villanova University, Mar. 1981.
Westphal & Christensen, Lime Stabilization: Effectiveness of Two Process Modifications, Nov. 1983.
Wallace & Tiernan Series A-758 Cat. File 330.100 Sep. 1989.

*Primary Examiner*—Neil McCarthy
*Attorney, Agent, or Firm*—Paul & Paul

[57] ABSTRACT

A method of treating sewage sludge is provided, in which the sludge is mixed with an alkaline material in such a way as to provide intimate surface contact that enables the alkaline material to permeate even small particles of the sludge, and to deliver the resultant product in a granular, scatterable form. The sludge and alkaline material are delivered to a mixing chamber and are confronted therein with a screw type mixer having generally helical flighting carried by a shaft, with the mixer being rotatably driven in generally horizontal arrangement to convey the mixture toward an outlet, with the mixture that is being mixed being maintained at a level in the mixer such that a spiral rolling action is imparted to the sludge and alkaline additive by the flighting engaging particles of sludge and rolling those particles up over the rotating shaft of the screw mixer. The rate of addition of sludge and additive into the mixer and/or the speed to rotation of the rotating screw in the mixer can be automatically adjusted as a function of the level of sludge being mixed in the mixer. The level of sludge may be reflected by various types of sensing means, such as torque load on the motor driving the screw shaft, visual detection devices, limit switch devices, etc. Preferably, two such helical screw mixers are provided working in opposition to each other.

17 Claims, 2 Drawing Sheets

U.S. PATENT DOCUMENTS

| | | | |
|---|---|---|---|
| 4,369,111 | 1/1983 | Roediger . | |
| 4,443,109 | 4/1984 | Watts | 366/156 |
| 4,460,470 | 7/1984 | Reimann . | |
| 4,474,479 | 10/1984 | Redelman | 366/297 |
| 4,478,578 | 10/1984 | Tomyn | 366/156 |
| 4,514,307 | 4/1985 | Chestnut et al. | 210/751 |
| 4,541,986 | 9/1985 | Schwab et al. | 210/764 |
| 4,597,872 | 7/1986 | Andersson et al. . | |
| 4,614,587 | 9/1986 | Andersson et al. . | |
| 4,632,759 | 12/1986 | Andersson et al. . | |
| 4,659,471 | 4/1987 | Molin et al. . | |
| 4,659,472 | 4/1987 | Norlund et al. . | |
| 4,663,043 | 5/1987 | Molin et al. . | |
| 4,710,032 | 12/1987 | Nordlund . | |
| 4,760,650 | 8/1988 | Theliander et al. . | |
| 4,779,528 | 10/1988 | Bruke . | |
| 4,781,842 | 11/1988 | Nicholson . | |
| 4,852,269 | 8/1989 | Glorioso . | |
| 4,902,431 | 2/1990 | Nicholson et al. . | |
| 4,938,605 | 7/1990 | Friedrich | 366/153 |
| 4,941,132 | 7/1990 | Horn et al. | 366/320 |
| 4,981,600 | 1/1991 | Tobler et al. | 210/739 |
| 5,013,458 | 5/1991 | Christy, Sr. et al. | 210/751 |
| 5,083,506 | 1/1992 | Horn et al. | 366/297 |

PROCESS AND APPARATUS FOR TREATING SEWAGE SLUDGE

This application is a continuation of application Ser. No. 07/954,657, filed Sep. 30, 1992, abandoned, which is a division of Ser. No. 749,988, filed Aug. 26, 1991, now U.S. Pat. No. 5,186,840.

FIELD OF THE INVENTION

The present invention relates to a process for treatment of sewage sludge, and apparatus for the same.

BACKGROUND OF THE INVENTION

The need for treating sewage sludge for disposal, and particularly municipal sewage sludge, has increased substantially in recent years. One way of doing so, is by mixing or blending alkaline materials with the sludge. There is also developing an increasing demand, particularly with respect to municipal sewage sludge, that the treatment of the sludge be sufficiently thorough that is will allow beneficial re-use of sludge, such as enabling the sludge to be applied to land on which agricultural and ornamental crops may be grown. In an effort to make stabilized sludge more marketable, those treating the sludge have attempted to produce a granular, scatterable product having a soil-like texture. One way of doing so is to mix alkaline products with sludge in a manner that blends the alkaline and sludge and transforms the otherwise pasty sludge into an acceptable end product.

However, conveying and mixing wastewater sludges are difficult functions due to certain inherent characteristics of wastewater sludges. Some such characteristics are the thixotrophic nature of the sludges, the variations in the sludge characteristics depending upon the process or methods that may be used in the wastewater process, the type of sludge that is produced as a function of the type of community, variations in amounts of solids present in the sludge, and variations in the properties and characteristics of the alkaline materials that are used for stabilization of sludge, in those instances where alkaline materials are used.

Prior to the invention hereof, other methods of mixing and/or blending sludge have been known, including the methods of Wurtz, U.S. Pat. Nos. 3,941,357 and 4,306,978; Manchak, U.S. Pat. No. 4,079,003; Roediger, U.S. Pat. No. 4,270,279 and Nicholson, U.S. Pat. No. 4,554,002 for example.

Wurtz U.S. Pat. No. 4,306,978 teaches mixing the sludge by using a series of plowshare working tools operating at rapid speeds to mechanically divide and separate particles, exposing the surfaces before coating them with lime.

Manchak U.S. Pat. No. 4,079,003 teaches the use of longitudinally spaced paddles for moving and agitating a mixture, particularly when the minimum solids concentration is in excess of 25%, so as to achieve an agglomeration of solids into a solid friable material, largely as a result of large quantities of lime to generate heat and cause dehydration and solidification.

Roediger U.S. Pat. No. 4,270,279 teaches combining sludge and alkaline materials without intimate mixing, but by dusting the surface only, as his invention, aimed at breaking up the sludge for sprinkling with quick lime in a simple paddle mixer.

Nicholson U.S. Pat. No. 4,554,002 teaches the necessity of a curing step, of, for example, three days duration.

SUMMARY OF THE INVENTION

The present invention is directed to providing a process that can operate at a slow speed, preferably 60 rpms or slower, and that does not require plowshare paddles for blending the material, that does not require a high percentage of solids content, that does not require huge quantities of lime, that achieves a very intimate mixing of the alkaline material with the sludge, and that does not require a necessary step of curing. The invention is accomplished by intimately mixing the sludge by one or more generally horizontally disposed screw mixers with generally helical flighting, under a sufficiently controlled level of depth of sludge and alkaline material in the screw mixer, to enable the screw mixer to impart a spiral rolling action to the sludge and alkaline additive, rolling the same up over the shaft of the mixing screw, to achieve an intimate dispersion of alkaline material through-out the interior of the sludge particles.

Accordingly, it is a primary object of this invention to provide a novel process and apparatus for treating partially dewatered sludge, that includes combining sludge with an alkaline material in a substantially closed chamber and mixing the same via a rolling action imparted by a generally horizontally disposed screw mixer, rolling the sludge and alkaline over the shaft of a screw mixer, to achieve the intimate dispersion of alkaline throughout the sludge particles.

It is a further object of this invention to accomplish the above object, wherein the level of sludge and alkaline additive is maintained in the mixing chamber, sufficient to enable the particles being mixed to roll over the shaft of the mixing screw or screws.

It is a further object of this invention to accomplish the method of, and provide an apparatus for, accomplishing the above objects, wherein a preferably automatic control is provided for the depth of materials being mixed in the mixing equipment.

Other objects and advantages of the present invention will be readily apparent from a reading of the following brief descriptions of the drawing figures, detailed descriptions of the preferred embodiments, and the appended claims.

DESCRIPTION OF THE PREFERRED EMBODIMENTS

Figure 1:
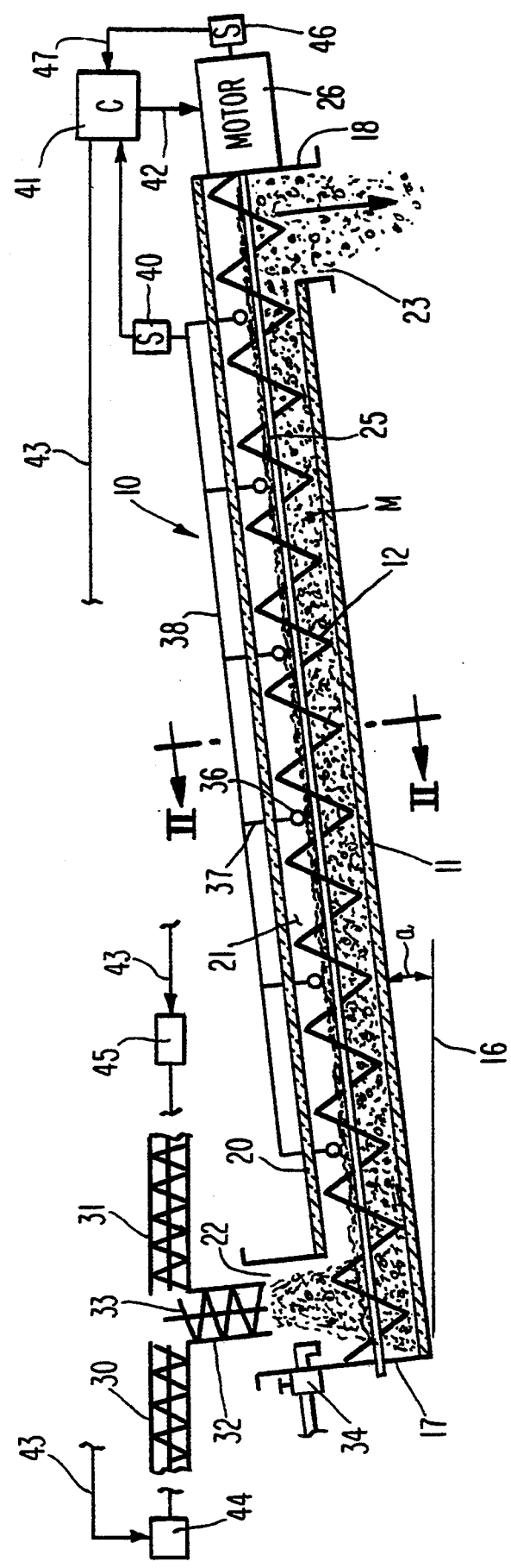
FIG. 1 is a longitudinal, schematic, sectional view taken through a mixing chamber, wherein the spiral screw is shown in mixing relation with sludge and alkaline materials that are being mixed therein, and wherein various controls and sensing mechanisms are also illustrated.
Figure 2:
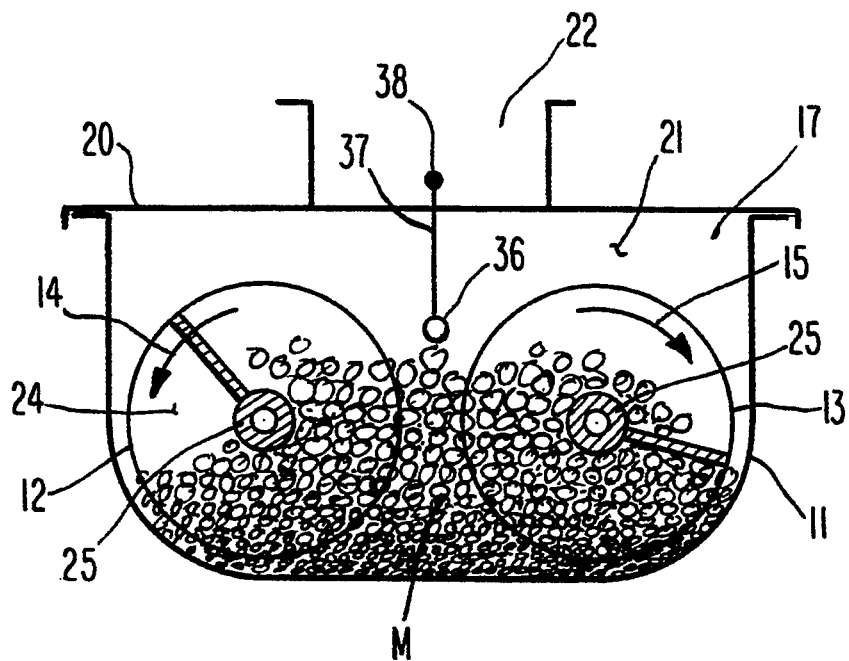
FIG. 2 is an enlarged, transverse, sectional, schematic view of the apparatus of FIG. 1, taken generally along the line II—II of FIG. 1, and wherein the rolling action of particles of sludge and alkaline additive, rolling from the zone between a pair of opposed screws, upwardly and outwardly over the shafts of the screws, is schematically illustrated.

Referring now to the drawings in detail, reference is first made to FIG. 1, wherein there is illustrated an apparatus 10, in accordance with this invention, as comprising an elongate chamber 11 having a pair of generally horizontally disposed screw mixers 12 and 13 therein, disposed for rotation in opposition to each other, as shown by the arrows 14 and 15, respectively, in FIG. 2.

The housing 11 is mounted in general horizontal disposition, which can include an upward incline from inlet to outlet, a flat non-inclined path from inlet to outlet, or even a slight downward incline from inlet to outlet, but is preferably at an angle "a" to the horizontal 16, which angle "a" is less than 45° to the horizontal within the meaning of general horizontal disposition, but which is more preferably within the range of 2° to 20°. Thus, the screw members 12 and 13 extend from an inlet end 17 to an outlet end 18 of the housing 11. A top closure 20 is provided for the housing, keeping the chamber interior 21 in substantially closed condition, with the exception of material inlets and outlets 22 and 23, respectively. Each screw member 14, 15 is provided with generally helical flighting 24 thereon, carried by a screw shaft 25, on the exterior thereof, between housing ends 17 and 18.

Each of the shafts 25 is rotatably driven by means of a suitable, generally electrically powered motor 26.

At the left end of FIG. 1, a conveyor 30 is provided, for delivering sludge that is to be treated into the inlet opening 22 of the housing. Another conveyor 31 is provided for delivering one or more alkaline additives thereto. It will be understood that the conveyor devices 30 and 31 may be of the auger type, as shown, or may be of the conveyor belt type, or of any other type (not shown) that will suffice to deliver the sludge and alkaline additive to the housing 11. Alternatively, the sludge and alkaline additive may be delivered together by means of one of the conveyors to the opening 22. Additionally, while in the apparatus as illustrated in FIG. 1, it is shown that the two separate conveyors 30 and 31 feed a common conduit 32 for delivery of their materials to the housing inlet 22, it will be noted that a common conduit 32 is not essential to this invention. Furthermore, it will be noted that an additional mixing apparatus 33 is illustrated in phantom inside the conduit 32. The mixing screw or other apparatus 33 is illustrated in phantom because it is optionally provided, in those instances in which it may be desired to preliminarily mix the sludge and alkaline additives that are being delivered via the conveyors 30 and 31, prior to their delivery to the inlet 22.

At the left end of the apparatus 10 of FIG. 1, there is also shown a spigot 34, for delivery of additional water to the housing 11, in those instances where additional water may be desired for facilitating the reaction with the alkaline additive, or for the addition of any other liquid additives that may be desired at the entry end of the apparatus.

In accordance with this invention, it is desired to keep the level of the materials "M" being mixed within the pockets formed between adjacent threads of flighting at levels, such that as the particles shown, for example in FIG. 2, are being mixed, they are contacted by the generally spiral flighting of the screws 12, 13, and have imparted to them a gentle rolling action by the rotation of the screws at a relatively slow speed, such that the particles are rolled upwardly over and around the shafts 25 of the screws. It will be understood, that within any given such pocket, substantial quantities of such particles will be thus rolled around the shafts 25, even when the screws 12 are sloped as discussed above.

In order to maintain the desired level of materials being mixed "M", various means may be employed to detect evidence of the height of material between the screws 12, 13 within the housing 11.

One such technique is to employ suitable sensors 36, such as light beams capable of being broken by material particles passing thereby, ultrasonic detectors, mechanical spring-loaded material sensors, ball cock "float" sensors, transducer sensors, etc. may also all, alternatively be employed. The purpose of the sensors 36 thus is to detect a shortfall or excess in height of material "M" and to send a signal via suitable signal conduits 38, such as of the electrically responsive type, to be transmitted to an appropriate sensor detector such as that 40, which in turn, will impart the information to a suitable controller 41, which, in turn can thereby correct the level of material "M" in the vicinity of the zone between the screw members 12, 13, by either causing the motor 26 to change its speed, via control line 42, or else can control the rate of addition of sludge or alkaline or both being provided through conveyors 30 or 31, by sending a control signal via line 43 to either or both of material flow controllers 44 and/or 45. The flow controllers 44, 45 may be of any type, such as physical flow dispensers, augers or other conveyor speed controllers, etc.

In lieu of using sensors 36 to effect an automatic control of the amount of material, and consequently the height of material "M" in the housing, a torque sensor 46 may be employed associated with the motor or motors 26 that drive the augers 12, 13 and which delivers a signal via line 47, to the control 41, which, in turn can likewise alternately or simultaneously control the speed of motors 26 and/or the feeds via feed controllers 44, 45, as aforesaid. Thus, the controlling step can include varying the rotational speed of the screws 12, 13 that provide the mixing and/or varying the rate of addition of sludge and additive at the inlet, thereby controlling the residence time of the sludge and additive in the mixer housing 11.

The sensing provided by the sensor 46 can sense the torque, as a function of the resistance of the sludge and additive to the mixing action that is provided by the rotating shafts 12, 13, and thereby automatically adjust the shaft speed as a function of that resistance. When motor torque is used, the shaft speed may be adjusted by either increasing it or decreasing it, to thereby reduce or increase the depth of sludge and additive along the screw mixer, thereby reducing or increasing the torque sensed on the shafts 12, of the screw members 12, 13. While the feedback control circuits described above allow for automatic adjustment of the infeed materials and/or rotational speeds of screw members 12, 13, it will be apparent that, if desired, non-automatic, or even manual adjustment techniques may also be employed, as desired.

The dewatered sludge that is added to the housing 11 at the inlet 22 will generally be in various consistencies, one of which is in the form of a filter cake, the consistency of which may vary, but which may be partially solid or putty-like, and that has a solids content in the range of 10% to 60% by weight. The alkaline additive that is added at the inlet 22 may be any single one of, or any combination of calcium oxide, calcium carbonate, hydrated lime, quicklime, lime kiln dust, cement kiln dust, or fly ash. As aforesaid, water or other additives may be provided via nozzle 34. The material "M" being mixed is mixed during the course of it being conveyed from the inlet 22 to the horizontally spaced outlet 23. The discharge of the mixture via the outlet 23 is such that there is achieved an intimate dispersion of the alkaline additive through the interior of the sludge particles thus discharged. Material thus treated, delivers particles within a size range of 2 inches or smaller and even more preferably within a size range of ½ inch to ¼ inch approximate diameter, and when such particles are cut open, they reveal such internal intimate dispersion of the additive.

It will also be noted that either of the conveyors 30, 31, or even an additional conveyor at the general location of the inlet 22, may be used to provide other solid materials, such as saw dust, wood chips, soil, sand, and organic materials, if desired. Furthermore, in some instances those other materials may be provided in the form of components of the sludge itself.

Figure 3:
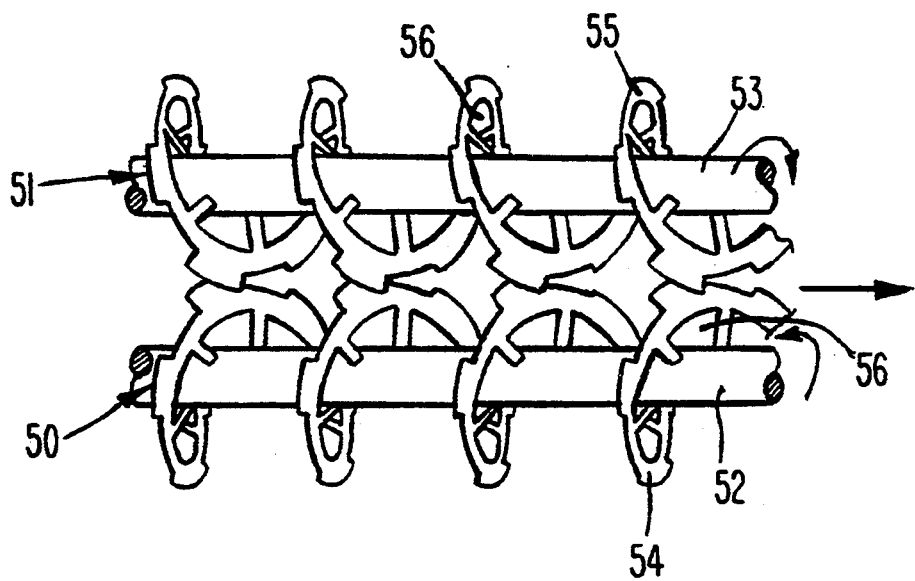
FIG. 3 is a top fragmentary view of a pair of alternate helical screw members for use in a mixing chamber such as that shown in FIGS. 1 and 2, but wherein the screws are provided with openings between the screw flighting and screw shaft for passing of particles of sludge and alkaline additive therethrough.

Referring now to FIG. 3, there is shown an alternative arrangement for the screws 12, 13 of FIG. 2, in the form of screws 50, 51. The screws 50, 51 are comprised of shafts 52, 53, respectively, with helical, or spiral flighting 54, 55, respectively, but wherein the flighting 54, 55 is provided with openings 56, to allow for the passage of particles of sludge and alkaline additive being mixed, passing between the flighting 54, 55 and respective shafts 52, 53, in order to facilitate further the mixing of material "M", and to prevent plugging or clogging of the auger(s).

The present invention produces a granular product with an intimate mixing of the sludge and alkaline materials, and is applicable to numerous different types of sludges, with varying characteristics, with a wide range of alkaline materials, and over a wide range of sludge solids concentration. Furthermore, it provides a granulation without requiring a solidification or drying of the blended product, and without requiring excess amounts of alkaline materials. No additional step of curing is necessary in accordance with this invention, in that the discharge of material through the outlet 23 is in the form of granulated particles ready for spreading. Nor is there required additional processing by shredding, crushing and the like. Furthermore the present invention enables one to relatively minimize the amount of alkaline material that is being used. Additionally, while not shown, the cover 20 of the apparatus 10 of this invention may, if desired, be fitted with an opening connection (optionally openable) to provide for removal of moisture and/or air, for odor control purposes. However, the cover 20 will generally be kept closed to contain the moisture and/or odors. The spiral rolling action that is provided in accordance with the present invention allows the intimate mixing without a high degree of energy or motion, but operates as a rather gentle motion, and thereby prevents the material "M" from becoming pasty. By this action, the larger, unmixed lumps tend to float to the surface of the bed of material in the zone between the mixers 12, 13. By controlling the level of material "M" so that it is just high enough to skim these lumps off the surface and over the tops of the shafts 25, the lumps pass over the shafts and are then drawn down into the bottom of the bed of material "M", causing a fracturing of the lumps, resulting in further intimate mixing as described above. This same movement and control of the level of material "M" allows the smaller, already-intimately-mixed material to tend to stay toward the bottom of the housing 11, and to move through the housing 11 from inlet toward outlet without consuming the additional energy which might otherwise cause the sludge to turn pasty.

It will be apparent from the foregoing that various modifications may be made of the details of construction, as well as of the use and operation of the invention as described herein. For example, while preferably a pair of opposed generally spiral screw members 12, 13, are used, it will be noted that it is possible to use a single screw member within a comparably, suitably sized housing, and yet to achieve satisfactory results in accordance with the present invention. Also, while certain types of sensing means 36, 46, are disclosed herein, for automatically controlling material input and motor speed, it will be apparent that various other types of controls may likewise be utilized. Additionally, while it is preferred that the housing 11 be maintained at a small acute angle relative to a horizontal surface 16, it is also possible to operate the apparatus while the auger screws are completely horizontal, or even with a slightly downward tilt, all within the definition of "generally horizontal" as described herein. Accordingly, the invention is as set forth in the appended claims.

What is claimed is:

1. Apparatus for treating partially dewatered sewage sludge comprising:
   (a) means providing the sludge from a source of sludge, said sludge having a solids content in the range of 10% to 60% by weight and
   (b) means combining the sludge with an additive from a source of additive, said additive comprising at least one alkaline additive selected from the group consisting of calcium oxide, calcium carbonate, hydrated lime, quicklime, lime kiln dust, cement kiln dust and fly ash; including
      (i) a substantially closed mixing chamber having at least one generally horizontally disposed shaft-mounted screw mixer with generally helical continuous flighting on the shaft, disposed therein and comprising means for imparting a rolling action to the sludge therealong, and means delivering sludge and additive to at least one inlet of the chamber;
      (ii) means for rotatingly driving the mixer in the chamber to intimately mix the sludge and additive therein while conveying the mixture in the chamber toward an outlet therein that is generally horizontally spaced from the inlet, wherein the chamber is closed except for the at least one inlet and the outlet; and
      (iii) means for controlling the rate of addition of any of sludge and additive to the inlet and the speed of rotation of the mixer to be amounts sufficient to maintain a level of depth of sludge and additive along the screw mixer in the chamber, that enables the mixer to impart a spiral rolling action to the sludge and additive, rolling particles of the sludge and additive over the rotating shaft of the screw mixer as the sludge and additive is conveyed through the mixer toward the outlet.

2. The apparatus of claim 1, wherein the means for rotatingly driving the mixer includes means for continuing to mix the sludge and additive in the mixer until the sludge and additive form particles of a size within the range of up to 2 inches approximate diameter, with internal intimate dispersion of additive throughout the interior of the sludge particles within said range.

3. The apparatus of claim 1, wherein the means for controlling includes means, for maintaining the level of depth of sludge and additive along the screw mixer in the chamber to be at least at the elevation of the top of the screw shaft.

4. The apparatus of claim 1, wherein the means for controlling includes means for varying the rotational speed of the screw mixer.

5. The apparatus of claim 1, wherein the means for controlling includes means for varying the rate of addition of any of sludge and additive to the inlet.

6. The apparatus of claim 1, wherein the means for controlling includes means for varying the rotational speed of the screw mixer, and means for varying the rate of addition of any of sludge and additive to the inlet, and thereby controlling the residence time of the sludge and additive in the mixer.

7. The apparatus of claim 4, including means for sensing the torque on the shaft as a function of resistance of the sludge and additive to the mixing action provided by the rotating shaft, and means for automatically adjusting the shaft speed as a function of said resistance.

8. The apparatus of claim 1, further comprising means for delivering to the mixer at least one other material selected from the group consisting of sawdust, wood chips, soil, sand and organic materials.

9. The apparatus of claim 1, wherein means are provided for adding the sludge and additive through the same chamber inlet.

10. The apparatus of claim 1, wherein means are provided for adding the sludge and additive through the chamber inlet at the same time.

11. The apparatus of claim 10, including means for premixing the sludge and additive prior to their being added through the chamber inlet.

12. The apparatus of claim 7, wherein the means for automatically adjusting the shaft speed includes means for increasing the shaft speed to reduce the depth of the sludge and additive along the screw mixer and thereby reduce the torque sensed on the shaft.

13. The apparatus of claim 1, including means for sensing the torque on the shaft as a function of resistance of the sludge and additive to the mixing action provided by the rotating shaft, and means for automatically adjusting the rate of addition of any of sludge and additive to the inlet.

14. The apparatus of claim 1, wherein the means for conveying the mixture in the chamber includes means for delivering the mixture along a substantially horizontal upward slope at an angle of slope within the range of 2° to 20°.

15. The apparatus of claim 1, wherein the delivering means includes means for delivering the sludge and additive to a mixing chamber having a pair of-opposed, oppositely rotating shaft-mounted helical screw mixers therein, and wherein the means for rotatingly driving the mixer includes means for rotating the shaft-mounted helical screws in directions for facilitating delivery of particles of sludge and additive from between the shafts, up and outwardly over the shafts of the shaft-mounted helical screws.

16. The apparatus of claim 1, wherein the means for mixing the mixture includes at least partial openings between the screw shaft and flighting.

17. The apparatus of claim 1, wherein the means for rotatingly driving the mixer includes means for mixing the sludge and additive in the mixer until the sludge and additive forms particles of a size within the range of up to 2 inches approximate diameter, with internal intimate dispersion of additive throughout the interior of the sludge particles within said range, wherein the means for controlling includes maintaining the level of depth of sludge and additive along the screw mixer in the chamber to be at least at the elevation of the top of the screw shaft, including means for sensing the torque on the shaft as a function of resistance of the sludge and additive to the mixing action provided by the rotating shaft, and means for automatically adjusting any of the shaft speed and rate of addition of any of the sludge and additive to the inlet, and wherein the means for conveying the mixture in the chamber includes means for delivering the mixture along a substantially horizontal upward slope at an angle of slope within the range of 2° to 20°.

* * * * *